United States Patent
Karlsson et al.

(10) Patent No.: US 11,916,720 B2
(45) Date of Patent: Feb. 27, 2024

(54) SUBCARRIER SPACING SELECTION FOR SYNCHRONIZATION SIGNALS

(71) Applicant: SONY GROUP CORPORATION, Tokyo (JP)

(72) Inventors: Peter C. Karlsson, Lund (SE); Rickard Ljung, Helsingborg (SE); Basuki Priyanto, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/338,340

(22) PCT Filed: Sep. 30, 2016

(86) PCT No.: PCT/EP2016/073503
§ 371 (c)(1),
(2) Date: Mar. 29, 2019

(87) PCT Pub. No.: WO2018/059716
PCT Pub. Date: Apr. 5, 2018

(65) Prior Publication Data
US 2020/0028726 A1 Jan. 23, 2020

(51) Int. Cl.
*H04L 27/26* (2006.01)
*H04L 5/00* (2006.01)
(Continued)

(52) U.S. Cl.
CPC ........ *H04L 27/2666* (2013.01); *H04L 5/0094* (2013.01); *H04L 27/2678* (2013.01);
(Continued)

(58) Field of Classification Search
CPC ............. H04L 27/2646; H04L 27/2666; H04L 27/2678; H04L 5/0007; H04L 5/0048;
(Continued)

(56) References Cited

U.S. PATENT DOCUMENTS 9,820,281 B1 * 11/2017 Werner ............... H04W 72/042
2008/0205351 A1 8/2008 Lindoff et al.
(Continued)

FOREIGN PATENT DOCUMENTS

CN 101917377 A 12/2010
JP 2015-215431 12/2015
(Continued)

OTHER PUBLICATIONS

Samsung: "Discussion on numerology aspects of NR synchronization signal",3GPP Draft; R1-166795, 3rd Generation Partnership Project (3GPP), Mobile Competence Centre; 650,Route Des Lucioles; F-06921 Sophia-Antipolis Cedex; France, vol. RAN WG1, No. Gothenburg, Sweden; Aug. 22, 2016-Aug. 26, 2016, Aug. 21, 2016, XP051125558, Retrieved from the Internet: URL:http://www.3gpp.org/ftp/Meetings_3GPP_SYNC/RAN1/Docs/ [retrieved on Aug. 21, 2016, sections 1,3,3.1,3.2; table 1.
(Continued)

*Primary Examiner* — Khaled M Kassim
(74) *Attorney, Agent, or Firm* — Myers Bigel, P.A.

(57) ABSTRACT

A wireless communication device identifies a set of multiple different subcarrier spacings which are supported for transmission of synchronization signals. From the set of different subcarrier spacings, the wireless communication device selects a subset of one or more subcarrier spacings. Further, the wireless communication device receives signals from the wireless communication network. On the basis of the subcarrier spacings of the subset, the wireless communication device monitors the received signals for synchronization signals.

16 Claims, 5 Drawing Sheets

(51) Int. Cl.
  *H04W 24/08*  (2009.01)
  *H04W 36/00*  (2009.01)
  *H04W 36/38*  (2009.01)
(52) U.S. Cl.
  CPC ....... *H04W 24/08* (2013.01); *H04W 36/0016* (2013.01); *H04W 36/38* (2013.01)
(58) Field of Classification Search
  CPC ... H04L 5/0053; H04L 5/0092; H04L 5/0094; H04W 24/08; H04W 36/0016; H04W 36/38
  See application file for complete search history.

(56) References Cited

U.S. PATENT DOCUMENTS

| | | | |
|---|---|---|---|
| 2009/0304100 A1* | 12/2009 | Brehler | H04L 5/0007 375/260 |
| 2015/0110066 A1 | 4/2015 | Gaal et al. | |
| 2015/0124579 A1 | 5/2015 | Sartori et al. | |
| 2015/0256308 A1* | 9/2015 | Ma | H04W 72/042 370/330 |
| 2016/0066321 A1* | 3/2016 | Yu | H04L 27/18 370/329 |
| 2016/0182201 A1* | 6/2016 | Jiang | H04L 27/2613 370/235 |
| 2017/0094547 A1* | 3/2017 | Yum | H04W 56/001 |
| 2017/0238344 A1* | 8/2017 | McGowan | H04L 5/0007 370/329 |
| 2017/0347340 A1* | 11/2017 | Haley | H04L 27/2657 |
| 2018/0007673 A1* | 1/2018 | Fwu | H04L 5/0092 |
| 2018/0084593 A1* | 3/2018 | Chen | H04W 76/11 |
| 2018/0097672 A1* | 4/2018 | Jung | H04W 56/0045 |
| 2018/0279388 A1* | 9/2018 | Miao | H04W 72/04 |
| 2018/0309533 A1 | 10/2018 | Yoshimoto et al. | |
| 2018/0376439 A1* | 12/2018 | Urabayashi | H04L 27/2613 |
| 2019/0149384 A1* | 5/2019 | Kim | H04L 27/2666 370/328 |
| 2019/0208482 A1* | 7/2019 | Tooher | H04L 27/2628 |
| 2019/0268205 A1* | 8/2019 | Shin | H04L 5/0048 |
| 2020/0059893 A1* | 2/2020 | Liu | H04L 5/0094 |

FOREIGN PATENT DOCUMENTS

| | | |
|---|---|---|
| JP | 2018207137 | 12/2018 |
| KR | 20130028106 A | 3/2013 |
| KR | 20150135268 A | 12/2015 |
| KR | 20150135272 A | 12/2015 |
| WO | 2016137532 | 9/2016 |

OTHER PUBLICATIONS

Convida Wireless: "Discussion on Sync Signals Supporting Different Numerologies", 3GPP Draft; R1-167847_Disccusion_On_DL Sync, 3rd Generation Partnership Project (3GPP), Mobile Competence Centre; 650, Route Des Lucioles; F-06921 Sophia Antipolis Cedex; France, vol. RAN WG1, No. Gothenburg, Sweden; Aug. 22, 2016-Aug. 26, 2016, Aug. 21, 2016, XP051140829, Retrieved from the Internet: URL:http://www.3gpp.org/ftp/Meetings_3GPP_SYNC/RAN1/Docs/ [retrieved on Aug. 21, 2016, sections 1,2,2.1; figure 2.
Huawei et al: "Synchronization and initial access mechanism in NR", 3GPP Draft; R1-166107, 3rd Generation Partnership Project (3GPP), Mobile Competence Centre; 650, Route Des Lucioles; F-06921 Sophia-Antipolis Cedex; France vol. RAN WG1, No. Gothenburg, Sweden; Aug. 22, 2016-Aug. 26, 2016, Aug. 21, 2016, XP051125218, Retrieved from the Internet: URL:http://www.3gpp.org/ftp/Meetings_3GPP_SYNC/RAN1/Docs/ [retrieved on Aug. 21, 2016, sections 3 and 4; figure 1.
Zte Corporation et al: "On forward compatibility for new radio interface", 3GPP Draft; R1-166210 On Forward Compatibility for New Radio Interface, 3rd Generation Partnership Project (3GPP), Mobile Competence Centre; 650, Route Des Lucioles; F-06921 Sophia-Antipolis Cedex; vol. RAN WG1, No. Gothenburg, Sweden; Aug. 22, 2016-Aug. 26, 2016, Aug. 21, 2016, XP051140118, Retrieved from the Internet: URL:http://www.3gpp.org/ftp/Meetings_3GPP_SYNC/RAN1/Docs/ [retrieved on Aug. 21, 2016], section 5.2.
PCT International Search Report and Written Opinion dated Feb. 13, 2017 for corresponding PCT International Application No. PCT/EP2016/073503.
Japanese Office Action corresponding to JP 2019-517267; dated Jun. 6, 2020 (10 pages, including English translation).
Bouzegzi et al. "New Algorithms for Blind Recognition of OFDM Based Systems", Signal Processing, Elsevier Science Publishers B.V., Amsterdam, NL, vol. 90, No. 3, Mar. 1, 2010, pp. 900-913.
Liu et al. "A Blind Time-Parameters Estimation Scheme for OFDM in Multi-Path Channel", Wireless Communications, Networking and Mobile Computing, 2005, Proceedings, 2005 International Conference on Wuhan, China, Sept. 23-26, 2005, Piscataway, NJ, IEEE, vol. 1, Sep. 23, 2005, pp. 222-227.
Chinese Office Action corresponding to CN 201680089726.4; dated Jan. 29, 2021 (18 pages, including English translation).
Samsung: "Discussion on numerology aspects of NR synchronization signal",3GPP TSG RAN WG1 Meeting #86; R1-166795, Gothenburg, Sweden, Aug. 22-26, 2016.
Intel Corporation , "Synchronization signal design and performance for NB-IoT", 3GPP TSG RAN WG1 Meeting #82bis in Malmö, Sween on Oct. 5-9, 2015, (5 pages).

* cited by examiner

SUBCARRIER SPACING SELECTION FOR SYNCHRONIZATION SIGNALS

CROSS REFERENCE TO RELATED APPLICATIONS

This application is a 35 U.S.C. § 371 national stage application of PCT International Application No. PCT/EP2016/073503, filed on Sep. 30, 2016, the contents of which are incorporated herein by reference in its entirety. The above-referenced PCT International Application was published in the English language as International Publication No. WO 2018/059716 A1 on Apr. 5, 2018.

FIELD OF THE INVENTION

The present invention relates to methods for enabling synchronization in a wireless communication network and to corresponding devices and systems.

BACKGROUND OF THE INVENTION

In wireless communication networks, such as a cellular network based on the LTE (Long Term Evolution) radio access technology specified by 3GPP ($3^{rd}$ Generation Partnership Project), synchronization signals are used for enabling synchronization of wireless communication devices (also referred to as user equipment or "UE") to base stations of the wireless communication network, referred to as eNB (evolved Node B). In the LTE radio access technology, these synchronization signals are referred to as PSS (Primary Synchronization Signal) and SSS Secondary Synchronization Signal). In the LTE radio access technology, the synchronization signals are transmitted by using OFDM (Orthogonal Frequency Division Multiplexing) with a subcarrier spacing of 15 kHz.

For the new radio ("NR") technology developed by 3GPP the range of available frequency spectrum may be very wide. Deployments in frequencies below 1 GHz are discussed, but also ranging up to 100 GHz. This wide frequency spectrum may require a more flexible OFDM scheme in which for example various bandwidths or subcarrier spacings are applied depending on the actually utilized frequency range. In addition, there may be different use cases targeted for different NR technology deployments, such as low latency communication, high data rate mobile broadband communication, massive machine type communication etc. For a given frequency range selected within a deployment, certain subcarrier spacing alternatives could be more suitable than others to deploy NR technology targeting a certain use case.

However, in case of the NR technology efficient implementation of synchronization may be challenging. Specifically, in view of the abovementioned flexibility of the utilized OFDM scheme, a UE which connects to the wireless communication network may lack information concerning the configuration which is actually applied for transmission of synchronization signals, e.g., which subcarrier spacing is used for transmission of the synchronization signals. On the other hand, transmitting synchronization signals with every possible subcarrier spacing may be undesirable in view of resource efficiency.

Accordingly, there is a need for techniques that allow for efficiently enabling synchronization in scenarios where multiple different subcarrier spacings are supported for the transmission of synchronization signals.

SUMMARY OF THE INVENTION

According to an embodiment, a method of enabling synchronization in a wireless communication network is provided. According to the method, a wireless communication device identifies a set of multiple different subcarrier spacings which are supported for transmission of synchronization signals. From the set of different subcarrier spacings, the wireless communication device selects a subset of one or more subcarrier spacings. Further, the wireless communication device receives signals from the wireless communication network. On the basis of the subcarrier spacings of the subset, the wireless communication device monitors the received signals for synchronization signals. By selecting the subset of subcarrier spacings, the wireless communication device may avoid considering every supported subcarrier spacing when monitoring the received signals for the synchronization signals. Accordingly, the synchronization process may be implemented in an efficient manner.

According to an embodiment, the wireless communication device selects the subset of subcarrier spacings depending on a set of one or more frequency ranges in which the signals are received. In this way, a dependency of the applied subcarrier spacings on the utilized frequency range or frequency ranges may be taken into account in an efficient manner.

According to an embodiment, the wireless communication device selects the subset of subcarrier spacings depending on a mapping of subcarrier spacings to frequency ranges. The mapping may be configurable by the wireless communication network, e.g., as part of operator settings. On the basis of the mapping, a dependency of the applied subcarrier spacings on the utilized frequency range or frequency ranges may be taken into account in an efficient manner.

According to an embodiment, the wireless communication device selects the subset of subcarrier spacings depending on a priority order of subcarrier spacings. The priority order may be configurable by the wireless communication network, e.g., as part of operator settings. On the basis of the priority order, a dependency of the applied subcarrier spacings on the utilized frequency range or frequency ranges may be taken into account in an efficient manner.

According to an embodiment, the wireless communication device selects the subset of subcarrier spacings depending on information received during preparation of a handover from a first base station to a second base station of the wireless communication network. In this way, the handover of the wireless communication device may be controlled in an efficient manner by facilitating synchronization of the wireless communication device to the second base station.

According to an embodiment, the wireless communication device identifies the set of multiple different subcarrier spacings on the basis of the received signals. Specifically, the wireless communication device may identify the set of subcarrier spacings on the basis of lengths of modulation symbols in the received signals and/or on the basis of lengths of cyclic prefixes of modulation symbols in the received signals. In this way, the set of multiple different subcarrier spacings may be identified in an efficient manner, considering that typically the duration of modulation symbols and also of the cyclic prefix of the modulation symbols will depend on the applied subcarrier spacing. The length of the modulation symbols may be considered in terms of an absolute time duration or in terms of a relative time duration related to the length of the modulation symbol.

According to an embodiment, the wireless communication device may identify two or more synchronization signals with different subcarrier spacing. For example, these synchronization signals could correspond to two or more identified cells of the wireless communication network or multiple transmissions from same cell. The wireless communication device may measure the received signal strength for the different synchronization signals and select the signal with highest signal strength for its synchronization process. The wireless communication device may also apply a prioritization among subcarrier spacings, to select its highest prioritized subcarrier spacing for its synchronization process.

Based on the synchronization signals, the wireless communication device may perform synchronization to a base station of the wireless communication network. Based on the subcarrier spacing used for transmission of the synchronization signals the wireless communication device may then receive system information indicating one or more subcarrier spacings supported by the base station, and/or an indication of the utilized center frequency of the transmitted carrier by the base station. These subcarrier spacings may also include one or more subcarrier spacings which have not yet been identified by the wireless communication device and/or one or more subcarrier spacings which are not utilized for transmission of synchronization signals. The indication of utilized center frequency may be an absolute of relative value, in relation to the frequency used for the synchronization signal. In this way, the wireless communication device may quickly obtain information on various subcarrier spacings supported by the base station and select a suitable subcarrier spacing for establishing a connection to the base station. Further, in this way the wireless communication device may quickly obtain information about the center frequency used by the base station.

According to a further embodiment, a method of enabling synchronization in a wireless communication network is provided. According to the method, a base station of the wireless communication network identifies a set of multiple subcarrier spacings which are supported for transmission of synchronization signals. From the set of multiple different subcarrier spacings, the base station selects a subset of one or more subcarrier spacings. The base station then transmits synchronization signals on the basis of the subcarrier spacings of the subset. By selecting the subset of subcarrier spacings, the base station may avoid transmitting synchronization signals on every supported subcarrier spacing and thereby improve resource efficiency and also facilitate synchronization of a wireless communication device with the base station.

According to an embodiment, the base station selects the set of subcarrier spacings depending on a set of one or more frequency ranges in which the base station is transmitting. In this way, a dependency of the applied subcarrier spacings on the utilized frequency range or frequency ranges may be taken into account in an efficient manner.

According to an embodiment, the base station selects the subset of subcarrier spacings depending on a mapping of subcarrier spacings to frequency ranges. The mapping may be configurable, e.g., by the base station itself and/or through a management system of the wireless communication network. On the basis of the mapping, a dependency of the applied subcarrier spacings on the utilized frequency range or frequency ranges may be taken into account in an efficient manner.

According to an embodiment, the base station selects the subset of subcarrier spacings depending on a priority order of subcarrier spacings. The priority order may be configurable, e.g., by the base station itself and/or through a management system of the wireless communication network. On the basis of the priority order, a dependency of the applied subcarrier spacings on the utilized frequency range or frequency ranges may be taken into account in an efficient manner.

According to an embodiment, the base station selects the subset of subcarrier spacings depending on information received from another base station of the wireless communication network. The information may for example be received during preparation of a handover of a wireless communication device and/or when establishing a connection between the base station and the other base station. On the basis of the received information, the subcarrier spacings which are applied for transmission of the synchronization signals and/or a frequency position of the synchronization signal, e.g., an offset of the synchronization signal with respect to a center frequency, may be coordinated between different base stations. For example, such coordination may aim at configuring neighboring base stations to utilize the same or similar subcarrier spacings. This may in turn facilitate handover processes or initial connection setup processes of wireless communication devices.

According to an embodiment, the base station receives information indicating one or more subcarrier spacings supported by a further base station. Depending on the received information, the base station may then control handover of a wireless communication device between the base station and the further base station. For example, if the wireless communication device supports only certain subcarrier spacings, the further base station may be selected in such a way that at least one of these subcarrier spacings is supported. In other words, the handover may be controlled in such a way that wireless communication device and a target base station of the handover have at least one matching supported subcarrier spacing.

According to an embodiment, the base station transmits signals based on at least one of the subcarrier spacings of the set in such a way that for each of the transmitted signals a length of modulation symbols and/or a length of a cyclic prefix of modulation symbols depends on the utilized subcarrier spacing. This may enable a wireless communication device to efficiently identify the subcarrier spacings applied for transmission of the signals, by considering the length of the modulation symbols and/or the length of the cyclic prefix of the modulation symbols. The length of the modulation symbols may be considered in terms of an absolute time duration or in terms of a relative time duration related to the length of the modulation symbol.

Based on the subcarrier spacing used for transmission of the synchronization signals, the base station may also transmit system information indicating one or more subcarrier spacings supported by the base station, and/or an indication of the utilized center frequency of the transmitted carrier by the base station. These subcarrier spacings may also include one or more subcarrier spacings which are not utilized for transmission of synchronization signals. The indication of utilized center frequency may be an absolute of relative value, in relation to the frequency used for the synchronization signal. In this way, a wireless communication device may quickly obtain information on various subcarrier spacings supported by the base station and select a suitable subcarrier spacing for establishing a connection to the base station. Further, in this way a wireless communication device may quickly obtain information about the center frequency used by the base station.

According to an embodiment, a wireless communication device is provided. The wireless communication device comprises a radio interface for connecting to a wireless communication network and at least one processor. The at least one processor is configured to identify a set of multiple different subcarrier spacings which are supported for transmission of synchronization signals, to select a subset of one or more subcarrier spacings from the set of different subcarrier spacings, to receive signals via the radio interface from the wireless communication network, to monitor the received signals for synchronization signals on the basis of the subcarrier spacings of the subset.

The at least one processor may configured to perform the steps as performed by the wireless communication device in the above method.

That is to say, the at least one processor may be configured to select the subset of subcarrier spacings depending on a set of one or more frequency ranges in which the signals are received.

Further, the at least one processor may be configured to select the subset of subcarrier spacings depending on a mapping of subcarrier spacings to frequency ranges. The mapping may be configurable by the wireless communication network, e.g., as part of operator settings.

Further, the at least one processor may be configured to select the subset of subcarrier spacings depending on a priority order of subcarrier spacings. The priority order may be configurable by the wireless communication network, e.g., as part of operator settings.

According to an embodiment, the wireless communication device selects the subset of subcarrier spacings depending on information received during preparation of a handover from a first base station to a second base station of the wireless communication network. In this way, the handover of the wireless communication device may be controlled in an efficient manner by facilitating synchronization of the wireless communication device to the second base station.

Further, the at least one processor may be configured to identify the set of multiple different subcarrier spacings on the basis of the received signals, in particular on the basis of lengths of modulation symbols in the received signals and/or on the basis of on the basis of lengths of cyclic prefixes of modulation symbols in the received signals.

Further, the at least one processor may be configured to perform, based on the synchronization signals, synchronization of the wireless communication device to a base station of the wireless communication network. Further, the at least one processor may be configured to receive, based on the subcarrier spacing used for transmission of the synchronization signals, system information indicating one or more subcarrier spacings supported by the base station, and/or an indication of the utilized center frequency of the transmitted carrier by the base station. These subcarrier spacings may also include one or more subcarrier spacings which have not yet been identified by the wireless communication device and/or one or more subcarrier spacings which are not utilized for transmission of synchronization signals.

According to an embodiment, a base station is provided. The base station comprises a radio interface for connecting to one or more wireless communication devices and at least one processor. The at least one processor is configured to identify a set of multiple subcarrier spacings which are supported for transmission of synchronization signals, to select, from the set of multiple different subcarrier spacings, a subset of one or more subcarrier spacings, and to transmit synchronization signals on the basis of the subcarrier spacings of the subset via the radio interface.

The at least one processor may configured to perform the steps as performed by the base station in the above method.

That is to say, the at least one processor may be configured to select the set of subcarrier spacings depending on a set of one or more frequency ranges in which the base station is transmitting.

Further, the at least one processor may be configured to select the subset of subcarrier spacings depending on a mapping of subcarrier spacings to frequency ranges. The mapping may be configurable, e.g., by the base station itself and/or through a management system of the wireless communication network.

Further, the at least one processor may be configured to select the subset of subcarrier spacings depending on a priority order of subcarrier spacings. The priority order may be configurable, e.g., by the base station itself and/or through a management system of the wireless communication network.

Further, the at least one processor may be configured to select the subset of subcarrier spacings depending on information received from another base station of the wireless communication network. The information may for example be received during preparation of a handover of a wireless communication device and/or when establishing a connection between the base station and the other base station.

Further, the at least one processor may be configured to receive information indicating one or more subcarrier spacings supported by a further base station. Depending on the received information, the at least one processor then control handover of a wireless communication device between the base station and the further base station.

Further, the at least one processor may be configured to transmit signals based on at least one of the subcarrier spacings of the set in such a way that for each of the transmitted signals a length of modulation symbols and/or a length of a cyclic prefix of modulation symbols depends on the utilized subcarrier spacing.

Further, the at least one processor may be configured to transmit, based on the subcarrier spacing used for transmission of the synchronization signals, system information indicating one or more subcarrier spacings supported by the base station, and/or an indication of the utilized center frequency of the transmitted carrier by the base station. These subcarrier spacings may also include one or more subcarrier spacings which are not utilized for transmission of synchronization signals.

According to an embodiment, a system is provided which comprises the above-mentioned base station and the one or more wireless communication devices. In this system, the wireless communication device(s) and the base station may operate according to the above methods.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to enabling synchronization in a wireless communication network, in particular to enabling synchronization of a wireless communication device, in the following also referred to as "UE", to one or more base stations of the wireless communication network. The synchronization is assumed to be performed on the basis of synchronization signals. The synchronization typically involves time alignment of processes in the UE with processes in the base station, e.g., processes concerning transmission and reception of signals. For example, the synchronization may involve determination of a timing advance to be applied by the UE when transmitting signals to the base station. However, the synchronization may also involve other processes, such as adjustment of a local clock in the UE.

The wireless communication network is assumed to utilize a radio technology based on multi-frequency modulation, such as OFDM or SC-OFDM (Single Carrier OFDM), where modulation symbols are modulated to multiple subcarriers which are distributed according to a subcarrier spacing in the frequency domain. The utilized radio technology may for example be based on the LTE technology or the NR technology. This kind of modulation is also applied to the synchronization signals. The synchronization signals may for example correspond to a well-defined symbol sequence which is both known to the base station and to the UE, e.g., a Zadoff-Chu sequence.

Further, it is assumed that multiple subcarrier spacings are supported in the wireless communication network. In particular, multiple subcarrier spacings may be utilized simultaneously by neighboring base stations, by the same base station, and/or by the same UE. For example, the applied subcarrier spacing may depend on the frequency range utilized for the transmission of the signals. According to one example, in a lower frequency range, a denser subcarrier spacing could be applied than in a higher frequency range. A corresponding example of frequency range dependent subcarrier spacings is illustrated in FIG. 1, which schematically shows the utilization of time (t) domain and frequency (f) domain radio resources for multi-frequency based transmission signals.

Figure 1:
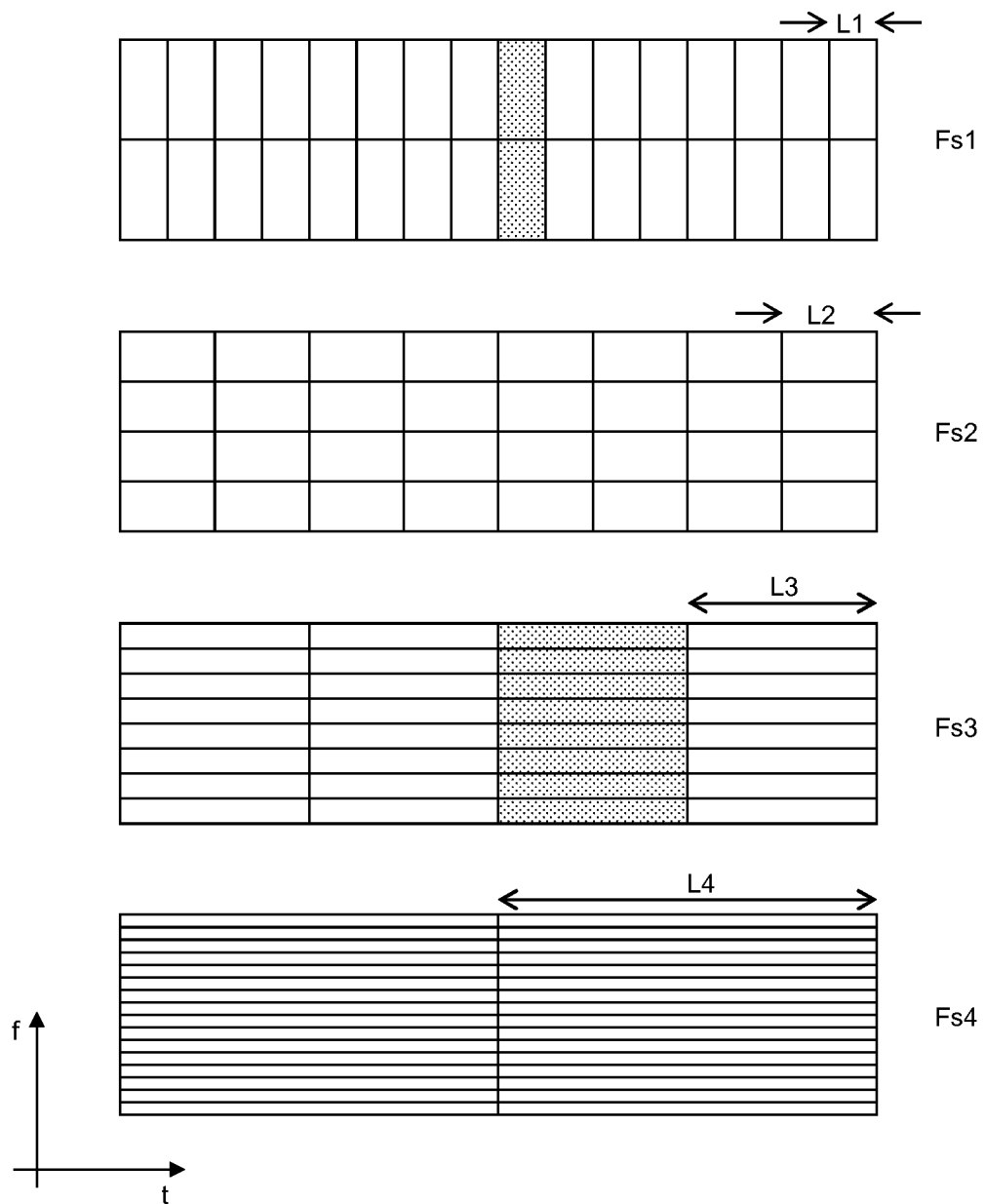
FIG. 1 schematically illustrates utilization of different subcarrier spacings for transmission of synchronization signals according to an embodiment of the invention.

In the example of FIG. 1, the signals are transmitted in four different frequency ranges, which may be distributed over a total bandwidth extending from below 1 GHz up to as high as 100 GHz. It is noted that these different frequency ranges may be distributed in various ways and in typical scenarios in an irregular frequency pattern, e.g., one frequency range below 1 GHz, and two frequency range in the region of 20 to 30 GHz, and one frequency range above 50 GHz. In a first frequency range a subcarrier spacing Fs1 is applied, in a second frequency range a second subcarrier spacing Fs2 is applied, in a third frequency range a third subcarrier spacing Fs3 is applied, and in a fourth frequency range a fourth subcarrier spacing Fs1 is applied. As can be seen, with decreasing frequency, a denser subcarrier spacing is applied. For example, the subcarrier spacing could be defined according to $2N \cdot 15$ kHz, where N is an integer which increases with the frequency. As further illustrated, also the lengths of modulation symbols may be scaled according to the utilized subcarrier spacing, in particular inversely proportional to the subcarrier spacing. In FIG. 1, a length of the modulation symbols in the first frequency range is denoted by L1, a length of the modulation symbols in the second frequency range is denoted by L2, a length of the modulation symbols in the third frequency range is denoted by L3, and a length of the modulation symbols in the fourth frequency range is denoted by L4. By scaling the lengths of the modulation symbols, the radio frames in the different frequency ranges may be defined in such a way that they carry the same amount of data and be aligned in the time domain, as illustrated in FIG. 1. Each set of subcarriers arranged according to a certain subcarrier spacing may occupy different portion of the system bandwidth. The system bandwidth may also be scalable, e.g., by using larger system bandwidth in higher frequency ranges. A higher system bandwidth may also be associated with a proportionally larger subcarrier spacing.

As a general rule, even if multiple subcarrier spacings are supported in the wireless communication system, not all of them need to be supported or actually be applied by every base station of the wireless communication system. Rather, a given base station could apply only a subset of the supported subcarrier spacings, such as only the subcarrier spacings Fs1, Fs2, and Fs3 as illustrated in FIG. 1. Further, also an individual UE does not need to support or actually utilize all the supported subcarrier spacings. For example, capabilities of the UE could be limited in such a way that it supports only some of the subcarrier spacings supported by the wireless communication network. Accordingly, when establishing a connection to the wireless communication network, the UE may need to find one or more subcarrier spacings which are supported by the UE and also applied by the base station to which the UE intends to connect.

Moreover, in the illustrated concepts it is assumed that not all subcarrier spacings which are applied for transmission of signals also need to be applied for transmission of synchronization signals. In the example of FIG. 1, radio resources which are utilized for transmission of synchronization signals are illustrated by shaded boxes. As can be seen, synchronization signals are transmitted in the first frequency range, using the first subcarrier spacing, and in the third frequency range, using the third subcarrier spacing. In the second frequency range and the fourth frequency range, in which the subcarrier spacing Fs2 and subcarrier spacing Fs4, respectively, are applied, there is no transmission of synchronization signals. By allowing to exclude certain frequency ranges and the corresponding subcarrier spacings from the transmission of the synchronization signals, efficiency of resource utilization can be improved. However, when establishing a connection to the wireless communication network, the UE may then also need to find at least one subcarrier spacing which is applied for the transmission of the synchronization signals.

As further illustrated in FIG. 1, the synchronization signals transmitted using different subcarrier spacings may be time aligned. Further, the synchronization signals may be transmitted in a periodic manner, using the same period for the synchronization signals transmitted using different subcarrier spacings. In this way, the synchronization process may be simplified by confining the transmission of the synchronization signals to certain time windows.

It is noted that the assignment of subcarrier spacings to transmission of synchronization signals as shown in FIG. 1 is merely exemplary, and that in other configurations other subcarrier spacings could be applied for the transmission of the synchronization signals, e.g., only the subcarrier spacing Fs4.

Figure 2:
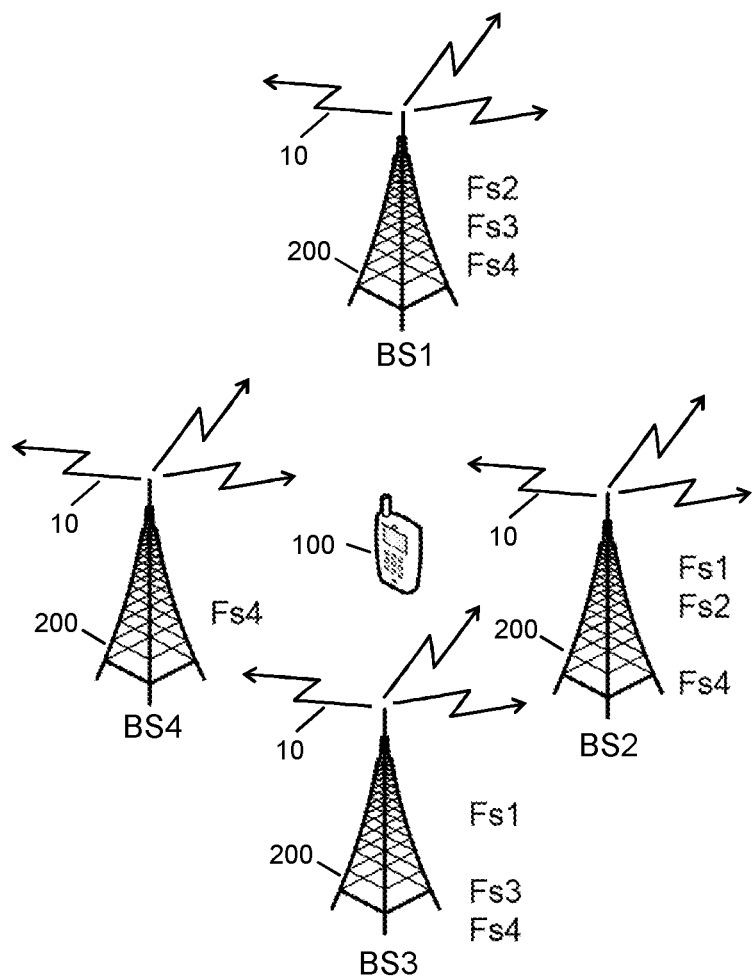
FIG. 2 schematically illustrates a scenario in which different subcarrier spacing configurations are applied by multiple base stations.

FIG. 2 schematically illustrates a scenario in which multiple base stations 200 apply different sets of subcarrier spacings for the transmission of signals 10. Further, FIG. 2 illustrates a UE 100 which is about to connect to the wireless communication network. In the example of FIG. 2, a first base station (BS1) applies the subcarrier spacings Fs2, Fs3, and Fs4 in the corresponding frequency ranges, a second base station (BS2) applies the subcarrier spacings Fs1, Fs2, and Fs4 in the corresponding frequency ranges, a third base station (BS3) applies the subcarrier spacings Fs1, Fs3, and Fs4 in the corresponding frequency ranges, and a fourth base station applies the subcarrier spacing Fs4 in the corresponding frequency range. If a base station applies multiple subcarrier spacings, like illustrated for the base stations BS1, BS2, BS3, not all of these subcarrier spacings also need to be applied for the transmission of the synchronization signals.

By scanning the signals 10 transmitted by the base stations, the UE 100 can identify which frequency range(s) is/are used by a certain base stations 200. For detecting the synchronization signals from the base stations 200, the UE 100 may process the signals 10 received from the base station 200 to decode a synchronization signal. For this purpose, the UE 100 may buffer the received signals 10 and attempt decoding on the basis of different subcarrier spacings, until decoding is successful.

In order to facilitate detection of the synchronization signals, the UE 100 selects certain subset of subcarrier spacings from a set of subcarrier spacings which are supported for transmission of the synchronization signals. As used herein, a subcarrier spacing supported for transmission of the synchronization signals is a subcarrier spacing which in the utilized radio technology is allowed to be applied for transmission of the synchronization signals, but does not necessarily need to be actually applied transmission of the synchronization signals. By selecting the subset of subcarrier spacings, the number of required decoding attempts for detecting the synchronization signals may be reduced. In some scenarios, it may even be possible to identify a single subcarrier spacing which is applied for the transmission of the synchronization signals.

Figure 3:
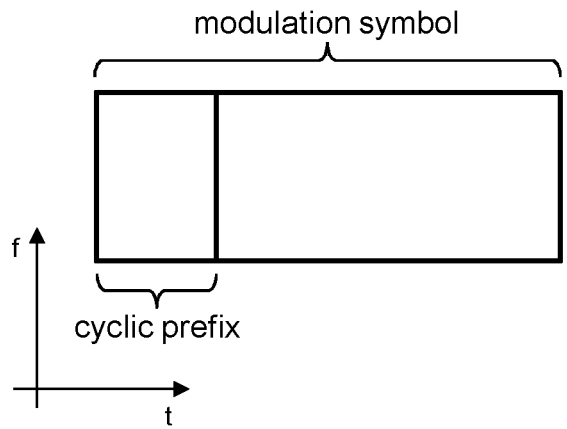
FIG. 3 schematically an OFDM symbol and cyclic prefix of the OFDM symbol.

In some scenarios, the UE 100 may also detect subcarrier spacings which are applied in the received signals, for example by performing multiple self-correlations of the received signal with a certain time window and time interval. The time window may be selected to correspond to a certain length of the cyclic prefix, and the time interval to the length of the modulation symbol. An example of a modulation symbol with a cyclic prefix is shown in FIG. 3. If a correlation is detected, the UE 100 may infer that the corresponding length of the cyclic prefix and corresponding length of the modulation symbol is used in the received signal. Based on a known dependency of the subcarrier spacing on the length of the modulation symbol and thus also the length of the cyclic prefix, such as illustrated in FIG. 1, the UE 100 may then deduce the utilized subcarrier spacing. For example, in response to detecting that the length of the modulation symbols is L1, the UE 100 may deduce that the subcarrier spacing Fs1 is applied.

Once the subcarrier spacings applied in the received signals have been identified, e.g., one or more of Fs1, Fs2, Fs3, and Fs4, the UE 100 may proceed to determining which of these subcarrier spacings is applied transmission of the synchronization signals, i.e., determine the subset of the subcarrier spacings.

The selection of the subset of subcarrier spacings may be based on a mapping of the utilized frequency band to subcarrier spacings. For example, such mapping could define that in a certain frequency band (e.g., above 20 GHz), the above-subcarrier spacing Fs1 and the subcarrier spacing Fs1 are applied for the transmission of the synchronization signals, like illustrated in FIG. 1. The mapping may be preconfigured in the UE 100 and the base stations 200, e.g., in accordance with a telecommunications standard. Further, the mapping could be configurable. For example, configuration of the base stations 200 with the mapping could be accomplished by a management system of the wireless communication network, and one of the base stations 200 could configure the UE 100 accordingly.

In addition or as an alternative, the selection of the subset of subcarrier spacings may be based on a priority order of the subcarrier spacings. For example, such priority order be preconfigured in the UE 100 and the base stations 200, e.g., in accordance with a telecommunications standard. Further, the priority order could be configurable. For example, configuration of the base stations 200 with the mapping could be accomplished by a management system of the wireless communication network, and one of the base stations 200 could configure the UE 100 accordingly. By way of example, the priority order could define that the densest applied subcarrier spacing is to be applied for the transmission of the synchronization signals. Accordingly, the base station 200 could transmit the synchronization signals only using the subcarrier spacing, and the UE 100 could apply only this subcarrier spacing when monitoring the received signals for the synchronization signal.

The base stations 200 may apply corresponding rules when deciding which subcarrier spacing to apply for transmission of the synchronization signals, e.g., select a subset subcarrier spacings based on the utilized frequency ranges, a mapping of frequency ranges to subcarrier spacings, and/or a priority order of subcarrier spacings.

The UE 100 may also measure a power level of each detected subcarrier spacing and select the subset of subcarrier spacings depending on the measured power level. For example, the subset could then be selected to include the subcarrier spacing(s) with the highest measured power level. This may for example be beneficial when the UE 100 is configured for high data rate services because it may facilitate connecting to a base station 200 offering a high radio channel quality.

In some scenarios, the UE 100 may select the subset of subcarrier spacings based on stored information on earlier utilized subcarrier spacings, e.g., information on the subcarrier spacings applied when the UE 100 was last connected to the wireless communication network. For example, when the UE 100 goes to idle mode or some other low-power mode and loses synchronization with the wireless communication network, it may store the currently applied subcarrier spacing(s), in particular those which are applied for the transmission of synchronization signals. When the UE 100 then needs to synchronize again, it may select the subset of subcarrier spacings for detection of the synchronization signals based on the stored information.

In some scenarios, the base stations 200 may coordinate the selection of the subcarrier spacings to be applied for the transmission of the synchronization signals. For this purpose, the base stations 200 may share information concerning the supported or the selected subcarrier spacings with other base stations 200, typically with neighboring base stations 200. This coordination may for example help when controlling a handover of the UE 100 between a source base station and a target base station. The source base station could select the target base station in such a way that it supports subcarrier spacings which are compatible with the UE 100. The sharing of the information may occur during handover preparation or at some other time, e.g., when setting up a connection between neighboring base stations 200. Further, the information could be shared indirectly via the UE 100, e.g., by the UE 100 detecting the subcarrier spacings applied by neighboring base stations 200 to the base station 200 it is connected to. For example, the UE 100 may provide corresponding measurement reports to the base station 200 it is connected to.

In some scenarios, the source base station can provide information to the UE 100 about subcarrier spacing utilized by neighbor base stations 200. This method could help the UE to quickly receive synchronization in the preparation of a handover. This information may be shared on an RRC (Radio Resource Control) level, i.e., with respect to the existing connection of the UE 100, or on a higher protocol level.

In some scenarios, information concerning the subcarrier spacings applied by a base station 200 may also be included in system information broadcasted by the base station 200. In this case, the system information can be transmitted on the basis of the same subcarrier spacing(s) that are selected for the transmission of the synchronization signals. The system information concerning the subcarrier spacings applied by the base station 200 may be transmitted in a continuous manner, e.g., with the same period as the synchronization signals.

In addition, some system information could also be transmitted based on all the utilized subcarrier spacings, including those which are not applied for transmission of synchronization signals. In the latter case, the transmitted system information may include specific information which is dedicated for the respective subcarrier spacing. For example, if in the example of FIG. 1 system information is transmitted on the basis of the subcarrier spacing Fs2, this system information may exclusively include parameters to be applied by the UE 100 when operating based on the subcarrier spacing Fs2. As compared to that, the system information which is transmitted using the same subcarrier spacing as the synchronization signal may be more generic and also include parameters to be applied by the UE 100 when operating based on other subcarrier spacings.

Further, the system information may also include information on an offset of the synchronization signal with respect to a center frequency of the set of subcarrier available for modulation. Specifically, if not all subcarriers available for modulation are utilized for the transmission of the synchronization signal, the subcarriers utilized for the transmission of the synchronization signal may be offset from the center frequency. This offset may be indicated in the system information, e.g., by one or more bits representing a channel raster index or a subcarrier index.

Figure 4:
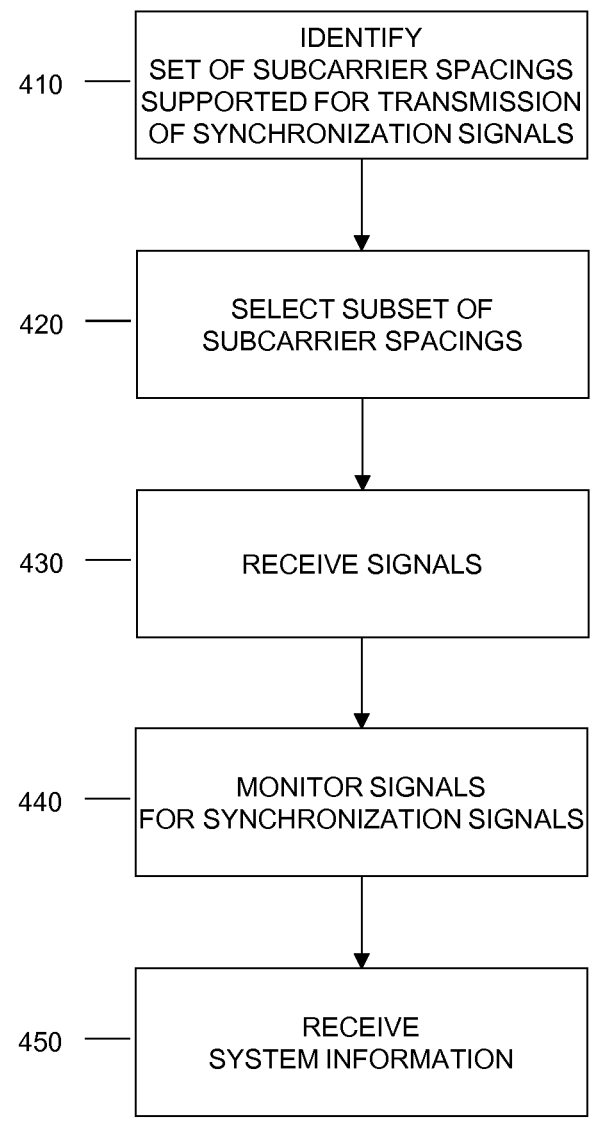
FIG. 4 shows a flowchart for illustrating a method according to an embodiment of the invention, which may be implemented by a wireless communication device.

FIG. 4 shows a flowchart illustrating a method which may be implemented by a wireless communication device, such as the UE 100, for enabling synchronization in a wireless communication network. For example, the method may be performed by the UE 100 to enable synchronization with one of the base stations 200. The synchronization may need to be performed in the course of establishing a connection of the wireless communication device to the wireless communication network. If a processor based implementation of the wireless communication device is utilized, at least a part of the steps of the method may be performed and/or controlled by one or more processors of the wireless communication device.

At step 410, the wireless communication device identifies a set of multiple different subcarrier spacings which are supported for transmission of synchronization signals. The wireless communication device may identify the set of multiple different subcarrier spacings on the basis of information configured in the wireless communication device, e.g., in accordance with a telecommunications standard and/or in accordance with operator settings.

Further, the wireless communication device may identify the set of multiple different subcarrier spacings on the basis of the received signals. Specifically, the wireless communication device may identify the set of subcarrier spacings on the basis of lengths of modulation symbols in the received signals and/or on the basis of on the basis of lengths of cyclic prefixes of modulation symbols in the received signals.

At step 420, the wireless communication device selects a subset of one or more subcarrier spacings from the set of different subcarrier spacings.

The wireless communication device may select the subset of subcarrier spacings depending on a set of one or more frequency ranges in which the signals are received. An example of such dependency of the applied subcarrier spacings on the utilized frequency range or frequency ranges is illustrated in FIG. 1.

Alternatively or in addition, the wireless communication device may select the subset of subcarrier spacings depending on a mapping of subcarrier spacings to frequency ranges. The mapping may be configurable by the wireless communication network, e.g., as part of operator settings.

Alternatively or in addition, the wireless communication device may select the subset of subcarrier spacings depending on a priority order of subcarrier spacings. The priority order may be configurable by the wireless communication network, e.g., as part of operator settings.

Alternatively or in addition, the wireless communication device may select the subset of subcarrier spacings depending on information received during preparation of a handover from a first base station to a second base station of the wireless communication network.

Further, the wireless communication device may select the subset of subcarrier spacings depending on power levels of received signals and/or depending on stored information concerning applied subcarrier spacings in earlier connections of the wireless communication device to the wireless communication network.

At step 430, the wireless communication device receives signals from the wireless communication network.

At step 440, the wireless communication device monitors the received signals for synchronization signals. This is accomplished on the basis of the subcarrier spacings of the subset selected at step 420. The wireless communication device may also monitor the power level received signals for each of the detected subcarrier spacings. The wireless communication device may then start the synchronization process with the subcarrier spacing that has highest power level.

Based on the synchronization signals, the wireless communication device may perform synchronization to a base station of the wireless communication network.

As illustrated by step 450, based on the subcarrier spacing used for transmission of the synchronization signals the wireless communication device may also receive system information. The received system information may indicate one or more subcarrier spacings supported by the base station. These subcarrier spacings may also include one or more subcarrier spacings which have not yet been identified by the wireless communication device and/or one or more subcarrier spacings which are not utilized for transmission of synchronization signals.

Figure 5:
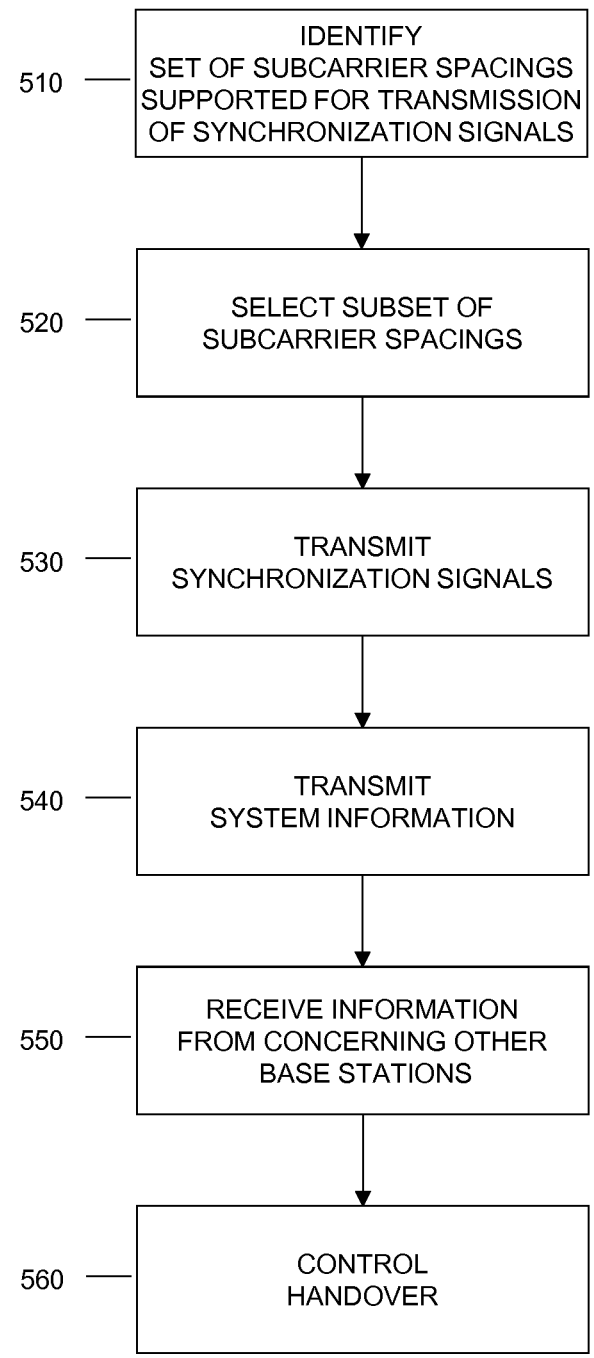
FIG. 5 shows a flowchart for illustrating a further method according to an embodiment of the invention, which may be implemented by a base station.

FIG. 5 shows a flowchart illustrating a method which may be implemented by a base station of a wireless communication network, such as one of the base stations 200, for enabling synchronization in a wireless communication network. For example, the method may be performed by one of the base stations 200 to enable synchronization of the UE 100 with this base station 200. The synchronization may need to be performed in the course of establishing a connection of the wireless communication device to the wireless communication network. If a processor based implementation of the base station is utilized, at least a part of the steps of the method may be performed and/or controlled by one or more processors of the base station.

At step 510, the base station identifies a set of multiple different subcarrier spacings which are supported for transmission of synchronization signals. The base station may identify the set of multiple different subcarrier spacings on the basis of information configured in the base station, e.g., in accordance with a telecommunications standard and/or in accordance with operator settings.

The base station may transmit signals based on at least one of the subcarrier spacings of the set in such a way that for each of the transmitted signals a length of modulation symbols and/or a length of a cyclic prefix of modulation symbols depends on the utilized subcarrier spacing, e.g., as explained in connection with FIGS. 1 and 3. The length of the modulation symbols may be considered in terms of an absolute time duration or in terms of a relative time duration related to the length of the modulation symbol.

At step 520, the base station selects a subset of one or more subcarrier spacings from the set of multiple different subcarrier spacings.

The base station may select the set of subcarrier spacings depending on a set of one or more frequency ranges in which the base station is transmitting. An example of such dependency of the applied subcarrier spacings on the utilized frequency range or frequency ranges is illustrated in FIG. 1.

Alternatively or in addition, the base station may select the subset of subcarrier spacings depending on a mapping of subcarrier spacings to frequency ranges. The mapping may be configurable, e.g., by the base station itself and/or through a management system of the wireless communication network.

Alternatively or in addition, the base station may select the subset of subcarrier spacings depending on a priority order of subcarrier spacings. The priority order may be configurable, e.g., by the base station itself and/or through a management system of the wireless communication network.

Alternatively or in addition, the base station may select the subset of subcarrier spacings depending on information received from another base station of the wireless communication network. The information may for example be received during preparation of a handover of a wireless communication device and/or when establishing a connection between the base station and the other base station. On the basis of the received information, the subcarrier spacings which are applied for transmission of the synchronization signals may be coordinated between different base stations. For example, such coordination may aim at configuring neighboring base stations to utilize the same or similar subcarrier spacings.

At step 530, the base station transmits synchronization signals on the basis of the subcarrier spacings of the subset selected at step 520.

At step 540, the base station may also transmit system information based on the subcarrier spacing used for transmission of the synchronization signals. The system information may indicate one or more subcarrier spacings supported by the base station. These subcarrier spacings may also include one or more subcarrier spacings which are not utilized for transmission of synchronization signals.

At step 550, the base station may receive information indicating one or more subcarrier spacings supported by a further base station. Depending on the received information, the base station may for example control handover of a wireless communication device between the base station and the further base station, as illustrated by step 560. For example, if the wireless communication device supports only certain subcarrier spacings, the further base station may be selected in such a way that at least one of these subcarrier spacings is supported. In other words, the handover may be controlled in such a way that wireless communication device and a target base station of the handover have at least one matching supported subcarrier spacing. The information received from the further base station may also be used for coordinating the selection of applied subcarrier spacings among neighboring base stations.

It is to be understood that the methods of FIGS. 4 and 5 may also be combined, e.g., in a system including at least one wireless communication device operating according to the method of FIG. 4 and at least one base station operating according to the method of FIG. 5.

Further, it is noted that the method steps of FIGS. 4 and 5 do not necessarily need to be performed in the illustrated order and that different order of the illustrated steps are possible or some of the illustrated steps could be performed in parallel. Further, individual actions or operations of different steps could be performed in an interleaved manner.

Figure 6:
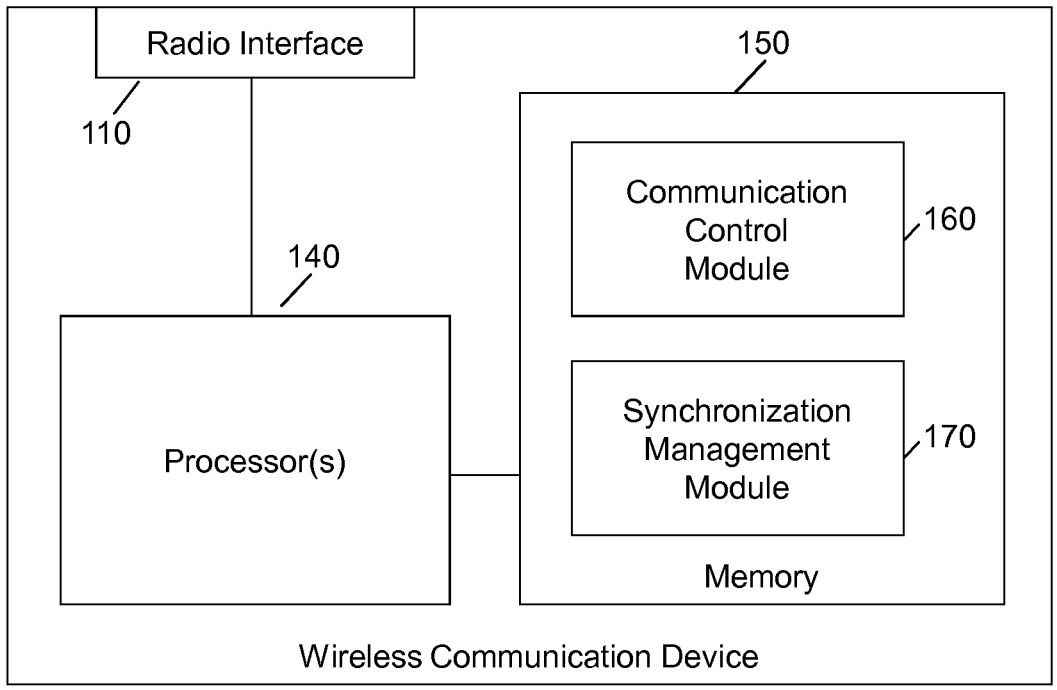
FIG. 6 schematically illustrates a processor-based implementation of a wireless communication device according to an embodiment of the invention.

FIG. 6 shows a block diagram for schematically illustrating a processor based implementation of a wireless communication device which may be utilized for implementing the above concepts. The wireless communication device may for example correspond to a UE, such as the above-mentioned UE 100.

As illustrated, the wireless communication device includes a radio interface 110. The wireless communication device may utilize the radio interface 110 for connecting to a wireless communication network, e.g., through a base station of the wireless communication network, such as one of the base stations 200.

Further, the wireless communication device is provided with one or more processors 140 and a memory 150. The radio interface 110 and the memory 150 are coupled to the processor(s) 140, e.g., using one or more internal bus systems of the wireless communication device.

The memory 150 includes program code modules 160, 170 with program code to be executed by the processor(s) 140. In the illustrated example, these program code modules include a communication control module 160 and a synchronization management module 170.

The communication control module 160 may implement functionalities of controlling wireless transmissions between the wireless communication device and the wireless communication network. The synchronization management module 170 may implement the above-described functionalities of selecting subcarrier spacings for detection of synchronization signals, e.g., according to the method of FIG. 4.

It is to be understood that the structures as illustrated in FIG. 6 are merely exemplary and that the wireless communication device may also include other elements which have not been illustrated, e.g., structures or program code modules for implementing known functionalities of a UE or other type of wireless communication device.

Figure 7:
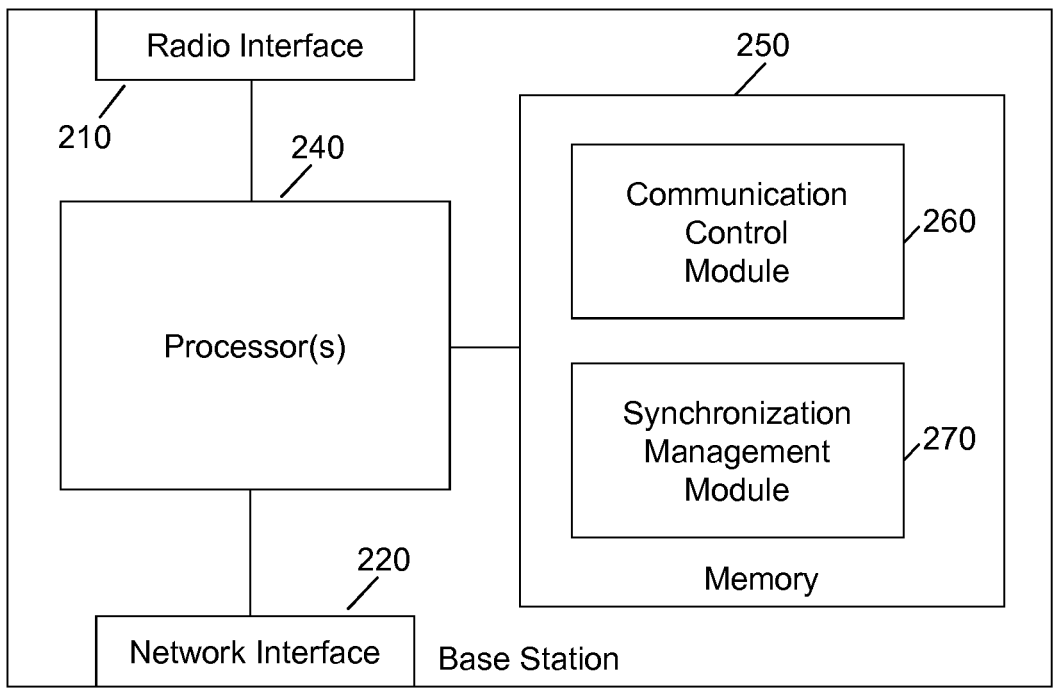
FIG. 7 schematically illustrates a processor-based implementation of a base station according to an embodiment of the invention.

FIG. 7 shows a block diagram for schematically illustrating a processor based implementation of a base station which may be utilized for implementing the above concepts. The base station may for example correspond to one of the above-mentioned base stations 200.

As illustrated, the base station includes a radio interface 210. The base station may utilize the radio interface 210 for connecting to at least one wireless communication device, e.g., a UE such as the UE 100. Further, the base station may include a network interface 220. The base station may utilize the network interface 220 for connecting to other nodes of the wireless communication network, in particular to other base stations.

Further, the base station is provided with one or more processors 240 and a memory 250. The radio interface 210, the network interface 220, and the memory 250 are coupled to the processor(s) 240, e.g., using one or more internal bus systems of the base station.

The memory 250 includes program code modules 260, 270 with program code to be executed by the processor(s) 240. In the illustrated example, these program code modules include a communication control module 260 and a synchronization management module 270.

The communication control module 260 may implement functionalities of controlling wireless transmissions between a wireless communication device and the wireless communication network. The synchronization management module 270 may implement the above-described functionalities of selecting subcarrier spacings for transmission of synchronization signals, e.g., according to the method of FIG. 5.

It is to be understood that the structures as illustrated in FIG. 7 are merely exemplary and that the base station may also include other elements which have not been illustrated, e.g., structures or program code modules for implementing known functionalities of a base station.

It is to be understood that the concepts as explained above are susceptible to various modifications. For example, the concepts could be applied in connection with various kinds of wireless communication technologies and devices. Further, the concepts may be applied in connection with various types of synchronization signals and modulation schemes.

The invention claimed is:

1. A method of enabling synchronization in a wireless communication network, the method comprising:
a wireless communication device identifying a set of multiple different subcarrier spacings which are supported for transmission of synchronization signals;
based on the selected subset of one or more subcarrier spacings from the set of different subcarrier spacings supported for transmission of the synchronization signals, the wireless communication device selecting a subset of one or more subcarrier spacings from the set of different subcarrier spacings;
based on the selected subset of one or more subcarrier spacings from the set of different subcarrier spacings supported for transmission of the synchronization signals, the wireless communication device receiving synchronization signals from the wireless communication network;
based on the synchronization signals, the wireless communication device performing synchronization to a base station of the wireless communication network; and
wherein the wireless communication device selects the subset of the one or more subcarrier spacings by identifying a set of one or more frequency ranges in which the signals from the wireless communication network are received and based on a mapping of the one or more subcarrier spacings to frequency ranges,
wherein the wireless communication device selects the subset of subcarrier spacings based on information received during preparation of a handover from a first base station to a second base station of the wireless communication network, and
wherein for each of the received synchronization signals a length of a cyclic prefix of modulation symbols is based on the utilized subcarrier spacing.

2. The method according to claim 1,
wherein the wireless communication device selects the subset of subcarrier spacings based on a priority order of subcarrier spacings.

3. The method according to claim 2, wherein the priority order is configurable by the wireless communication network.

4. The method according to claim 1, wherein the wireless communication device detects the set of multiple different subcarrier spacings on the basis of the received signals.

5. The method according to claim 4, wherein the wireless communication device identifies the set of multiple different subcarrier spacings on the basis of lengths of cyclic prefixes of modulation symbols in the received signals.

6. A method of enabling synchronization in a wireless communication network, the method comprising:
a base station of the wireless communication network identifying a set of multiple subcarrier spacings which are supported for transmission of synchronization signals;
from the set of multiple different subcarrier spacings, the base station selects a subset of one or more subcarrier spacings, which are supported for transmission of synchronization signals;
the base station transmitting synchronization signals based on the selected at least one of the one or more subcarrier spacings of the subset,
wherein the base station selects the subset of the one or more subcarrier spacings based on a set of frequency ranges in which the base station is configured to transmit and based on a mapping of the one or more subcarrier spacings to the frequency ranges,
wherein the base station communicates information about subcarrier spacings used by neighboring base stations, and
wherein for each of the transmitted synchronization signals a length of a cyclic prefix of modulation symbols is based on the utilized subcarrier spacing.

7. The method according to claim 6,
wherein the base station applies the subset of one or more subcarrier spacings based on a priority order of subcarrier spacings.

8. The method according to claim 7,
wherein the priority order is configurable.

9. The method according to claim 6,
wherein the base station applies the subset of one or more subcarrier spacings based on information received from another base station of the wireless communication network.

10. The method according to claim 6, further comprising:
based on the subcarrier spacing used for transmission of the synchronization signals, the base station transmitting system information indicating the subset of one or more subcarrier spacings supported by the base station.

11. The method according to claim 6, further comprising:
the base station receiving information indicating one or more subcarrier spacings supported by a further base station; and
depending on the received information, the base station controlling handover of a wireless communication device between the base station and the further base station.

12. A wireless communication device, comprising:
a radio interface for connecting to a wireless communication network; and
at least one processor,
the at least one processor being configured to:
identify a set of multiple different subcarrier spacings which are supported for transmission of synchronization signals;
select a subset of one or more subcarrier spacings from the set of different subcarrier spacings;
based on the selected subset of one or more subcarrier spacings from the set of different subcarrier spacings supported for transmission of the synchronization signals, receive synchronization signals from the wireless communication network;
based on the synchronization signals, the wireless communication device perform synchronization to a base station of the wireless communication network; and
wherein the wireless communication device is configured to select the subset of the one or more subcarrier spacings by identifying a set of one or more frequency ranges in which the signals from the wireless communication network are received and based on a mapping of the one or more subcarrier spacings to frequency ranges,
wherein the wireless communication device is configured to select the subset of subcarrier spacings based on information received during preparation of a handover from a first base station to a second base station of the wireless communication network, and
wherein for each of the received synchronization signals a length of a cyclic prefix of modulation symbols is based on the utilized subcarrier spacing.

13. The wireless communication device according to claim 12, wherein the at least one processor is configured to perform the operations of a method according to claim 2.

14. A base station, comprising:
a radio interface configured to connect to one or more wireless communication devices in a wireless communication network; and
at least one processor,
the at least one processor being configured to:
identify a set of multiple subcarrier spacings which are supported for transmission of synchronization signals;
from the set of multiple different subcarrier spacings, the base station selects a subset of one or more subcarrier spacings, which are supported for transmission of synchronization signals;
via the radio interface transmit synchronization signals based on the selected at least one of the one or more subcarrier spacings of the subset,
wherein the at least one processor is configured to select the subset of the one or more subcarrier spacings based on a set of frequency ranges in which the base station is configured to transmit and based on a mapping of the one or more subcarrier spacings to the frequency ranges,
wherein the at least one processor is configured to communicate information about subcarrier spacings used by neighboring base stations, and
wherein for each of the transmitted synchronization signals a length of a cyclic prefix of modulation symbols is based on the utilized subcarrier spacing.

15. The base station according to claim 14, wherein the at least one processor is configured to perform the operations of a method according to claim 7.

16. A system, comprising:
a base station according to claim 14; and
the one or more wireless communication devices.

* * * * *

UNITED STATES PATENT AND TRADEMARK OFFICE
CERTIFICATE OF CORRECTION

PATENT NO. : 11,916,720 B2
APPLICATION NO. : 16/338340
DATED : February 27, 2024
INVENTOR(S) : Karlsson et al.

It is certified that error appears in the above-identified patent and that said Letters Patent is hereby corrected as shown below:

In the Claims

Column 15, Line 59-Column 16, Line 27: Please delete Claim 1 and replace with the following:
1. A method of enabling synchronization in a wireless communication network, the method comprising:
    a wireless communication device identifying a set of multiple different subcarrier spacings which are supported for transmission of synchronization signals;
    the wireless communication device selecting a subset of one or more subcarrier spacings from the set of different subcarrier spacings;
    based on the selected subset of one or more subcarrier spacings from the set of different subcarrier spacings supported for transmission of the synchronization signals, the wireless communication device receiving synchronization signals from the wireless communication network;
    based on the synchronization signals, the wireless communication device performing synchronization to a base station of the wireless communication network; and
    wherein the wireless communication device selects the subset of the one or more subcarrier spacings by identifying a set of one or more frequency ranges in which the signals from the wireless communication network are received and based on a mapping of the one or more subcarrier spacings to frequency ranges,
    wherein the wireless communication device selects the subset of subcarrier spacings based on information received during preparation of a handover from a first base station to a second base station of the wireless communication network, and
wherein for each of the received synchronization signals a length of a cyclic prefix of modulation symbols is based on utilized subcarrier spacing.

Signed and Sealed this
Twenty-fifth Day of November, 2025

John A. Squires
*Director of the United States Patent and Trademark Office*